United States Patent
Krützfeldt et al.

(10) Patent No.: US 8,157,531 B2
(45) Date of Patent: Apr. 17, 2012

(54) CLOSING ASSEMBLY FOR A BLADE RING OF TURBOMACHINERY

(75) Inventors: Joachim Krützfeldt, Mülheim an der Ruhr (DE); Markus Kunze, Hünxe (DE); Silvio-Ulrich Martin, Oberhausen (DE); Stefan Mutke, Lauf (DE); Kang Qian, Mülheim an der Ruhr (DE); Christoph Richter, Ibbenbüren (DE); Oliver Schneider, Wesel (DE); Peter Schröder, Essen (DE); Michael Schwarz, Mülheim (DE); Ulrich Waltke, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 747 days.

(21) Appl. No.: 12/087,317

(22) PCT Filed: Dec. 27, 2006

(86) PCT No.: PCT/EP2006/070228
§ 371 (c)(1),
(2), (4) Date: Jan. 27, 2009

(87) PCT Pub. No.: WO2007/077185
PCT Pub. Date: Jul. 12, 2007

(65) Prior Publication Data
US 2009/0220345 A1    Sep. 3, 2009

(30) Foreign Application Priority Data
Jan. 2, 2006 (EP) .................................. 06000026

(51) Int. Cl.
*B64C 11/04* (2006.01)
*F03B 3/12* (2006.01)
*F04D 29/34* (2006.01)

(52) U.S. Cl. ................... 416/220 R; 416/215; 416/216; 416/217; 416/218

(58) Field of Classification Search .............. 416/220 R, 416/219 R, 215, 204 R, 216, 217, 218
See application file for complete search history.

(56) References Cited

U.S. PATENT DOCUMENTS

| 2,421,855 | A | | 7/1943 | Soderberg |
| 3,721,506 | A | * | 3/1973 | Anderson ................... 416/215 |
| 2002/0106279 | A1 | * | 8/2002 | Selby ................... 416/9 |
| 2002/0127105 | A1 | | 9/2002 | Bachofner et al. |
| 2006/0222502 | A1 | * | 10/2006 | Hansen et al. ............ 416/220 R |

FOREIGN PATENT DOCUMENTS

| DE | 809 689 | | 8/1951 |
| DE | 26 15 701 | A1 | 10/1976 |
| DE | 29 34 298 | | 3/1980 |
| EP | 1 302 677 | A1 | 4/2003 |
| EP | 1 457 642 | A2 | 9/2004 |
| GB | 1 270 540 | | 4/1972 |

\* cited by examiner

Primary Examiner — J. H. Hur

(57) ABSTRACT

A closing assembly for closing the gap remaining between the first and last blade of a blade ring that is inserted into a peripheral groove of turbomachinery is provided. The assembly includes at least two parts each of which can be hooked onto projections that form an undercut in the peripheral groove and includes a securing element, which secures the parts from becoming detached from the peripheral groove. For closing the remaining gap, the securing element is mounted to rotate about its longitudinal axis between the two parts and has a key head and a web. The web can be positioned by rotation is such a way that to fit the parts in the peripheral groove. The parts can be displaced in relation to one another and to secure the parts from being detached from the groove. The web can be placed against at least one lateral face of one of the parts.

15 Claims, 3 Drawing Sheets

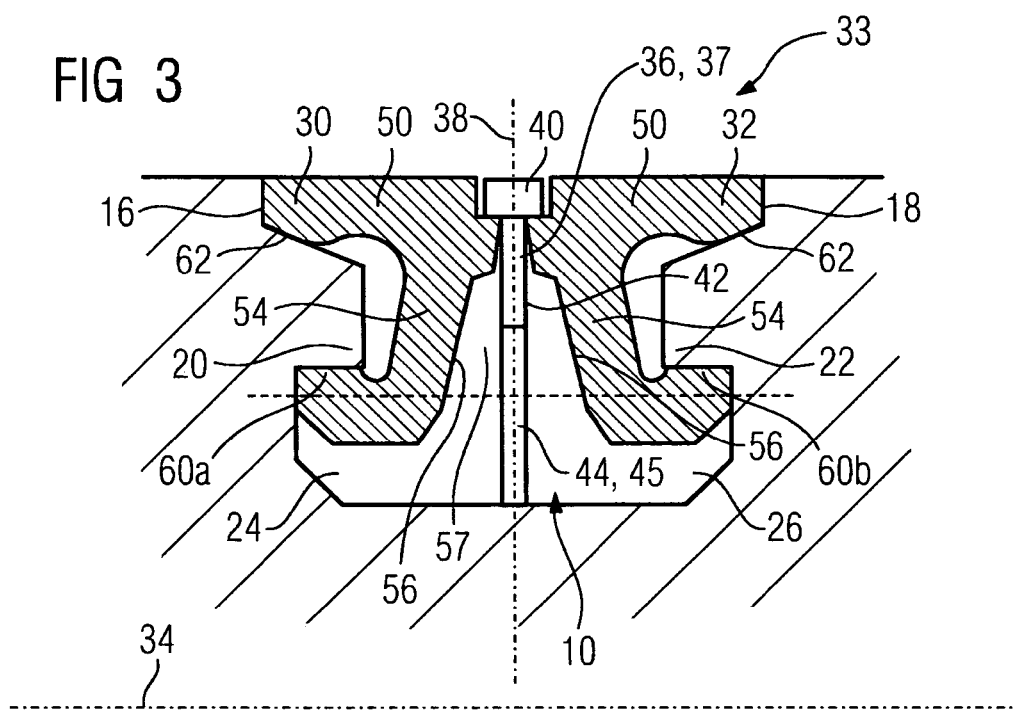
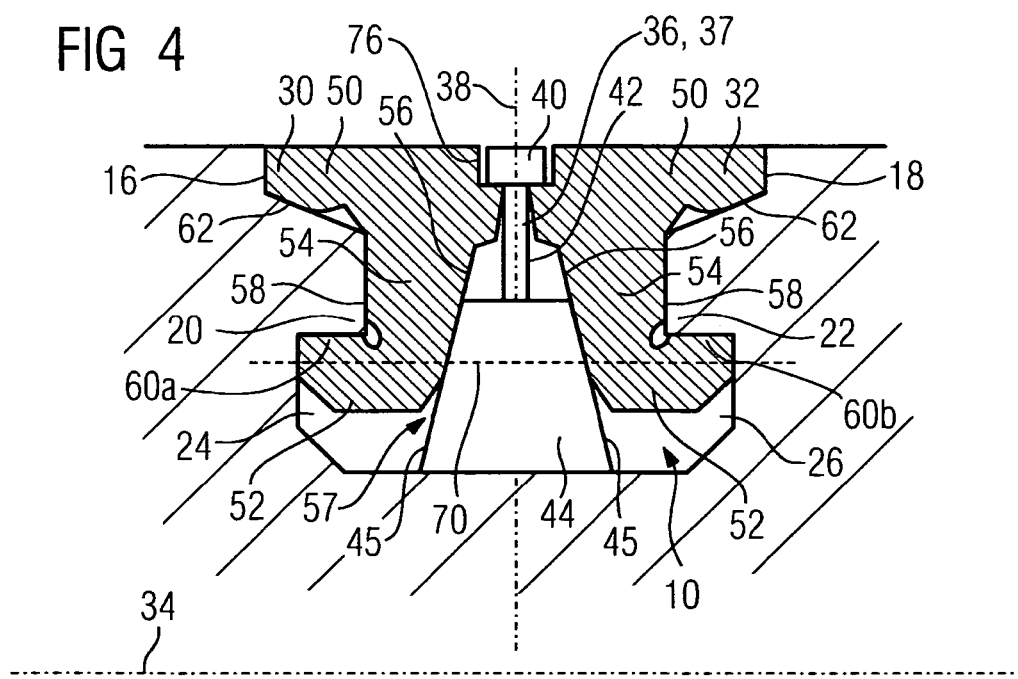

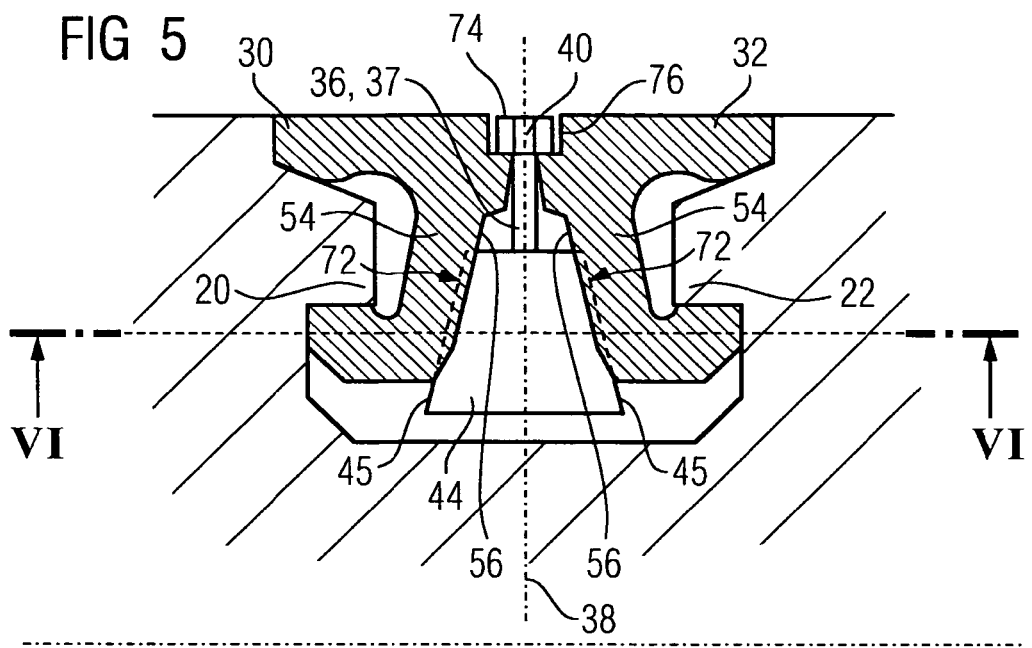
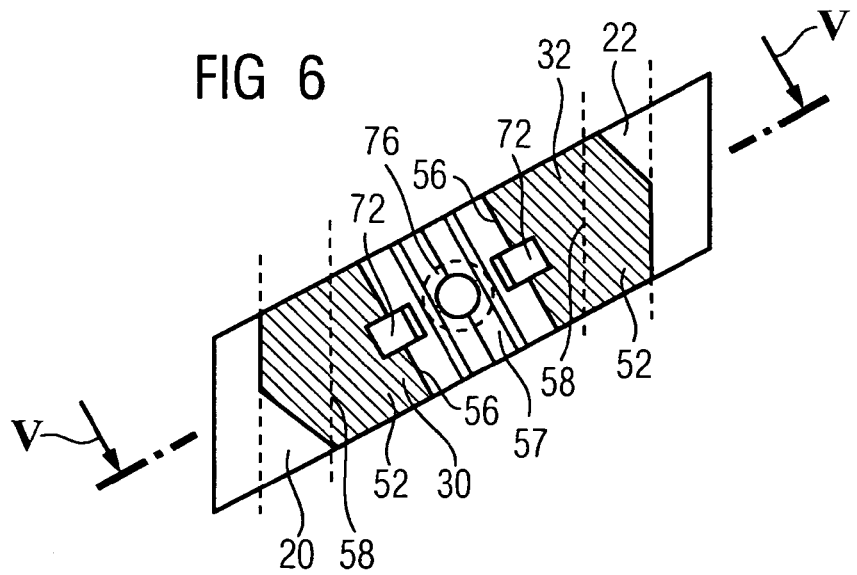

US 8,157,531 B2

CLOSING ASSEMBLY FOR A BLADE RING OF TURBOMACHINERY

CROSS REFERENCE TO RELATED APPLICATIONS

This application is the US National Stage of International Application No. PCT/EP2006/070228, filed Dec. 27, 2006 and claims the benefit thereof. The International Application claims the benefits of European application No. 06000026.2 filed Jan. 2, 2006, both of the applications are incorporated by reference herein in their entirety.

FIELD OF INVENTION

The invention relates to a closing assembly for closing the remaining intermediate space between the first and the last blades, which are inserted in a circumferential groove of turbomachinery, of a blade ring, having at least two parts which can each be hooked by means of projections, which form an undercut, on the circumferential groove, and having a securing element which secures the parts against falling out of the circumferential groove.

BACKGROUND OF THE INVENTION

Closing assemblies of this generic type are disclosed, for example, in EP 1 457 642 A2 and US 2002/0127105 A1. Both closing assemblies essentially comprise two side parts which are inserted into the remaining intermediate space between the first and the last blades of a blade ring. Since each side part is in each case hooked to a projection, which forms the undercut, on the circumferential groove and both side parts can therefore be moved into the intermediate space, the two side parts together are narrower, when seen in the axial direction, than the intermediate space to be filled and to be closed. After the two side parts have been fitted, a space once again remains free between them, and must be filled with an intermediate part. The intermediate part secures the two side parts against axial movement releasing the respective hook and therefore against falling out of the circumferential groove. In order to secure the intermediate part itself against falling out, it is equipped with in each case two lip-like webs, each of which is bent by plastic deformation into a pocket which is provided on each side part. In consequence, the intermediate part with each side part is hooked in an interlocking manner, as a consequence of which the two side parts are likewise held in the circumferential groove. US 2002/0127105A1 also proposes that the intermediate part be hooked via a dovetail to the first and the last blade of the blade ring, while in contrast, according to EP 1 457 642 A1, each side part of the closing assembly is hooked to the first and the last blade of the blade ring. This essentially prevents gap formation and enlargement between adjacent rotor blades and the closing assembly in the circumferential direction.

However, the known closing assemblies have the disadvantage that, in order to remove the closing assembly, it must be at least partially destroyed in the area of the interlock, which is costly. It should also be noted that the closing assembly must withstand the thermal and mechanical loads which occur, in particular the centrifugal force which occurs during operation, when it is mounted in the rotor of turbomachinery.

Furthermore, Patent Specification 809 689 from the German Patent Office discloses a closing assembly having two side parts which can move with respect to one another and between which a trapezoidal clamping element is provided in order to brace the two parts in a circumferential groove in a rotor. Once the parts of the closing assembly have been inserted into the circumferential groove, the trapezoidal clamping element can be raised in the direction of the groove opening by means of a screw which is supported on the groove base of the circumferential groove. This results in the two side parts being moved apart from one another, so that their shoulders engage behind the projections on the circumferential groove.

In this case, it has been found to be disadvantageous that the screw which is required to raise the clamping element is supported on the groove base of the circumferential groove. As a result of the different thermal expansions of the rotor and the components of the closing assembly, and because of the effects of centrifugal force, the contact of the screw and groove base can accidentally become undone, as a result of which the closing assembly is no longer seated securely.

In addition, blade root locking with two halves is known from Laid-Open Specification DE 29 34 298. The two halves can each be hooked to the projections which are arranged on the side walls of the circumferential groove. In order to secure the two halves in the groove at a distance, and therefore hooked, they are in the form of split threaded nuts so that one securing screw can be screwed in between them.

Furthermore, U.S. Pat. No. 2,421,855 discloses a turbine blade lock which hooks the two parts of the closing assembly to the undercuts in the circumferential groove, by raising a trapezoidal clamping element.

Furthermore, GB 1 270 540 and DE 26 15 701 disclose deformable attachment means which can be used to connect two parts to one another.

SUMMARY OF THE INVENTION

The object of the invention is accordingly to provide a closing assembly for closing the remaining intermediate space between the first and the last blades, which are inserted in a circumferential groove of turbomachinery, of a blade ring, which can be detached easily and at low cost and nevertheless reliably withstands the high mechanical loads, over a long life.

According to the invention, this object is achieved by a closing assembly in which the securing element is arranged between the two parts such that it can rotate about its longitudinal axis and has a key head and a key bit which is in the form of a plate and can be positioned between two positions by rotation of the securing element such that, in a first position for fitting, the parts can be inserted at the same time into the circumferential groove by pivoting with respect to one another between the opposite projections on the circumferential groove and can then be spread apart from one another, and such that, in a second position in order to secure the parts against pivoting with respect to one another in their installed position, the key bit can be placed on at least one side surface of one of the spread parts.

The invention is based on the discovery that the two parts, which are also referred to as the front part and as the rear part, with respect to the axial direction of a rotor which has the circumferential groove, cannot be moved into the circumferential groove successively but at the same time, if both parts can be moved with respect to one another, with their areas facing the circumferential groove, such that they pass through between the narrowest point of the circumferential groove, seen in the axial direction. Both parts are essentially C-shaped, each having two arms and a web which connects the two arms, with the outer of the two arms of each C-shaped part, when in its installed position, closing the circumferential groove flat with the outer surface adjacent to the circumferential groove, and in this case with the capability for the inner arm of each C-shaped part to be hooked to a projection, which forms the undercut, on the circumferential groove. When in the installed position, the web which extends between the inner and the outer arm of each part runs in the radial direction. Each web has a side surface which faces the opposite part, and these side surfaces bound a dish area in the axial direction. A key is arranged between the two parts of the closing assembly and its key bit can be positioned in the key area in the axial direction, not only saving space but also filling the axial key area. For installation, the key is positioned such that the two parts can be moved with their inner arms, which are introduced first into the circumferential groove, with respect to one another, and in particular can be tilted, such that the side surfaces bound a particularly narrow axial key area. The key therefore requires only a small axial width for insertion, so that the inner arms of the mutually tilted parts of the closing assembly can be introduced into the free space between the opposite projections on the circumferential groove. Once the outer arms of the parts are resting on the outer side walls of the projections on the circumferential groove, the inner arms of the parts are respectively pivoted forwards and backwards by moving the closing assembly in further, that is to say the parts are spread apart from one another, until the inner arms are hooked to the respective projections. In this installed position, the side surfaces of the spread parts bound a key area whose axial width is considerably broader than that during the fitting process. Considered in cross section, the key area, which is bound by the side surfaces, increases trapezoidally towards the groove base, inwards. In order to fill this physical space—considered along the circumference—at least one point in the axial direction, the key is rotated so that its bit rests on at least one side surface of one of the two parts. The key bit, which rests on the side surface, of the key then prevents movement or pivoting of the two parts with respect to one another, so that the closing assembly is secured against falling out of the circumferential groove. In order to remove the closing assembly, the process steps are carried out in the opposite sequence. The invention is therefore distinguished by a particularly small number of components. Because of the relatively large remaining empty key area in the interior of the circumferential groove, this also allows the closing assembly to have a particularly lightweight construction, which is particularly advantageous for use in a rotor, because of the reduced centrifugal-force load. Furthermore, the parts can be manufactured particularly easily and at low cost. In addition, the closing assembly can be assembled and/or disassembled comparatively quickly, since all the elements of the closing assembly are inserted into the circumferential groove at the same time. Furthermore, because the key can be rotated, there is no need for destruction to release the closing assembly.

One major feature of the invention is that the securing element, which is in the form of a key, is arranged between the two parts such that it can rotate about its longitudinal axis, and has a key head and a key bit. The key bit can be moved between two positions. In a first position, the key bit occupies a particularly narrow axial physical space, so that the two parts can be moved with respect to one another on the groove side. In a second position, the key bit—seen in the circumferential direction—fills the key area, at least one point in it, between the two parts which have been spread apart from one another, therefore preventing the two parts from being pivoted with respect to one another. This means that it is possible for each inner arm of the two parts, which is required for hooking to a projection which forms the undercut, at an angle into the circumferential groove, and to engage behind the respective projection on the circumferential groove by being pivoted in only when it is arranged in the area of the undercut. Until now, with the prior art, each part had to be fitted by means of two successive fitting steps, by firstly introducing the front (or rear) part radially into the circumferential groove and moving it in the axial direction towards the front end (or towards the rear end) of the circumferential groove, followed by the second part. The invention now specifies a closing assembly in which, with the fitting of the closing assembly, the hooking of each side part to the projections which form the undercuts is made possible by pivoting in, or a final rotary movement. This results in a closing assembly which can be fitted particularly easily and can be detached and disassembled again, in addition, particularly easily without destruction.

In contrast to known solutions, the securing element which spreads the two parts is not supported on the groove base of the circumferential groove, but is braced exclusively by the two parts. This results in a secured closing assembly which is intrinsically closed and is secured reliably against accidental decomposition, irrespective of the thermal expansion of the rotor. Advantageous refinements are specified in the dependent claims, for developments of the invention.

In a first advantageous development, the securing element can be moved from the first position to the second position by rotation through 90°.

The parts are secured particularly advantageously against pivoting and against falling out of the circumferential groove by the key bit being in the form of a double bit with two bit halves, and each bit half can in each case be placed on one side surface of each part. Since each bit half can be placed on one side surface of each part, the key area which is enclosed between the two side surfaces of the parts which have been tilted apart from one another is filled without any gaps at this point, in the cross section seen in the axial direction, so that this also reliably prevents the key from being bent out of the radial direction. This allows the parts to be secured particularly reliably against pivoting and against falling out of the circumferential groove.

If the side surface of the part has a slot for holding the key bit, in which the key bit can partially engage, the key is secured against rotation by the slot, so that even vibration occurring during operation of the turbomachinery, or other influences, cannot cause unplanned twisting of the key. The key bit which is engaging in the slot accordingly also particularly reliably prevents the pivoting of the parts with respect to one another and, in a corresponding manner, the parts falling out of the circumferential groove.

In one development of the key, the key has a receptacle on the key head for a rotating tool, by means of which the key can be rotated particularly easily from its fitted position to the secured position or operated position, and back. For example, the key head has a receptacle which may be in the form of a hexagon, a quadrilateral or a star, for a corresponding screwdriver. In one particularly advantageous refinement, each part can be placed on a side wall which is formed by a projection, which forms the undercut, on the circumferential groove. This prevents the entire closing assembly from being able to rotate as a unit within the circumferential groove when the intermediate space between the first and the last blade of the blade ring is enlarged in the circumferential direction, for unpredictable reasons. Even in this situation, the proposed development specifies a particularly reliable closing assembly, which is protected against falling out of the circumferential groove.

In order to place the key bit particularly reliably on the side surface of each part in a prestressed manner, the key head has an external thread for a threaded nut to be screwed onto, which threaded nut is supported on both parts and braces the securing element with the two parts. Since the key area of the parts which have been folded apart from one another widens towards the groove base in the form of a trapezoid, the key bit, seen in cross section, is correspondingly conical. This wedge-like key bit is drawn into the key area, which tapers outwards, because of the threaded nut which is supported on the two parts on the outside, therefore bracing the two parts particularly firmly with the projections and with the key. A closing assembly can therefore be specified in which inadvertent autonomous twisting of the key can be prevented particularly reliably.

In order to avoid aerodynamic losses in the area of the closing assembly, the key head and/or the threaded nut can be recessed into both parts. If, furthermore, the securing element or the threaded nut is secured against becoming loose, for example by securing it by application of a comparatively small amount of force, it is impossible for the parts of the closing assembly to fall out of the circumferential groove, without this being planned.

The closing assembly may in particular be used in turbomachinery, for example in a turbine, in a gas turbine, in a compressor or within a steam turbine, which in each case has a rotor with at least one circumferential groove with an undercut, and with rotor blades inserted therein, with the remaining intermediate space between the first and the last rotor blades inserted in the circumferential groove being closed by the closing assembly according to the invention. The turbomachinery and the rotor have a particularly long life and, in the situation in which the rotor blades in the ring have to be replaced, the closing assembly can be removed and used again particularly easily, quickly and at low cost.

BRIEF DESCRIPTION OF THE DRAWINGS

The rest of the explanation of the invention will be based on the exemplary embodiments illustrated in the drawing, in which, in detail:

FIGS. 3, 4 show cross-sectional views of the closing assembly according to the invention, at different positions within the circumferential groove, during installation, and FIG. 5 shows a further refinement of the closing assembly, in the form of a cross-sectional view along the section line VI, and FIG. 6 shows a sectional view V of the circumferential groove with the intermediate space closed, in a further embodiment variant of the invention.

DETAILED DESCRIPTION OF INVENTION

Figure 1:
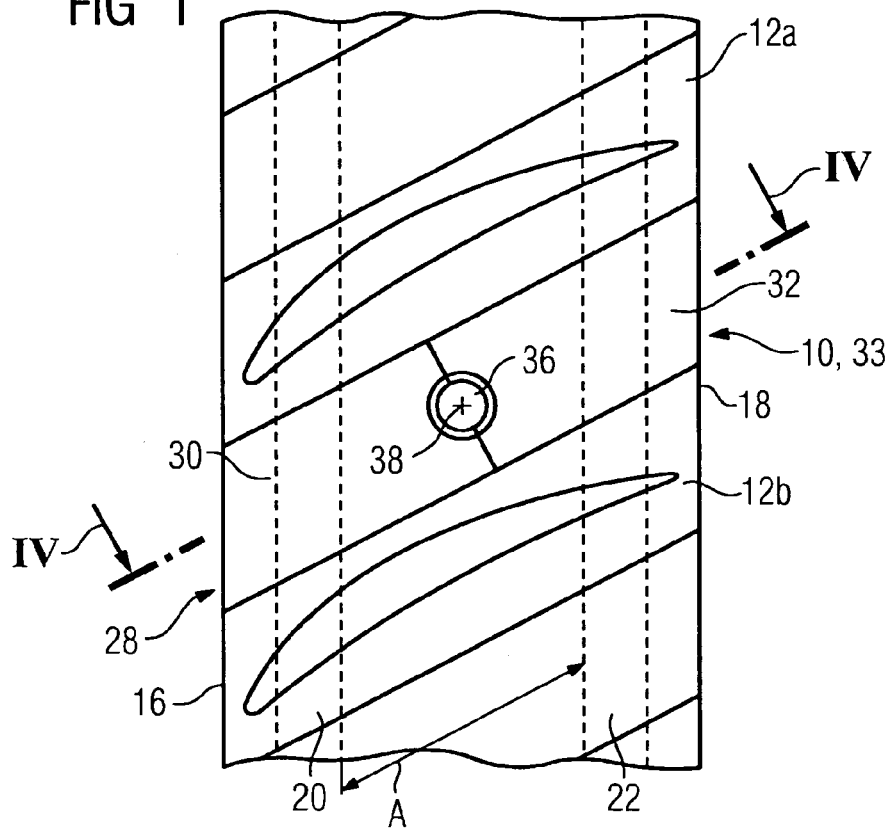
FIG. 1 shows a plan view of a circumferential groove fitted with rotor blades, in which the remaining intermediate space between the first and the last rotor blade is closed by a closing assembly which comprises two parts and a securing element.
Figure 2:
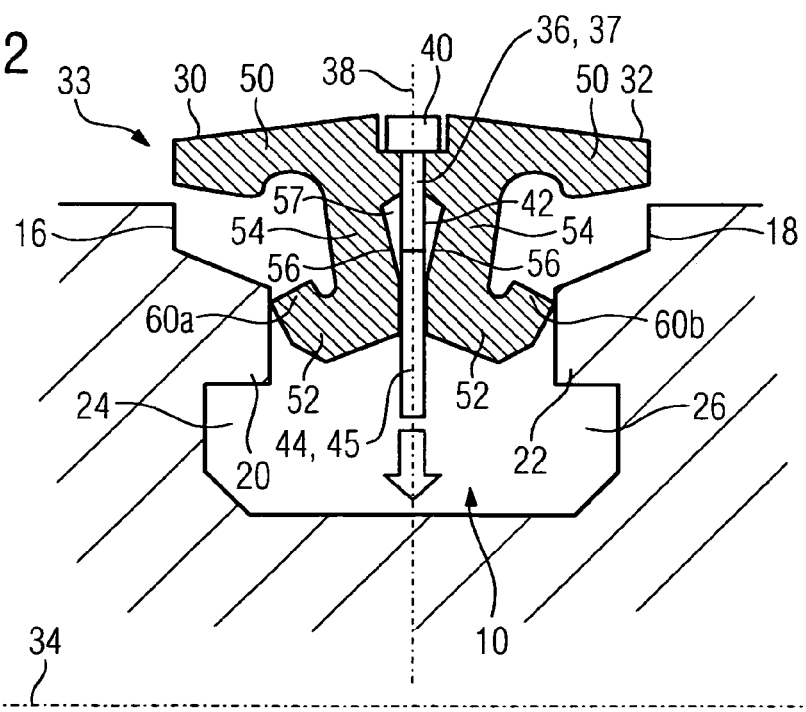
FIG. 2 shows a cross-sectional view of the circumferential groove with the closing assembly, arranged in a tilted position, during installation in the circumferential groove.

FIG. 1 shows a detail of a circumferential groove 10, in which blades 12 of turbomachinery have been inserted. The circumferential groove 10 is provided on the outer surface of a rotor of the turbomachinery. The circumferential groove 10 could also be provided on an internal housing of a compressor for an aircraft turbine, to which rotor blades are attached. Seen in the axial direction of the rotor, the circumferential groove 10 has a front side wall 16 and a rear side wall 18, on which projections 20 and 22 are arranged, which each run in the circumferential direction, extend in the axial direction, and each form a front and a rear undercut 24, 26 (FIG. 2).

Rotor blades 12a, 12b are inserted into the circumferential groove 10 and have hammer-shaped blade roots which are designed to correspond to the undercuts 24, 26. In this case, the rotor blades 12a, 12b are inserted into the circumferential groove 10 and are then rotated, for example through 45° or 60°, until the hammer-shaped blade roots engage behind the projections 20, 22.

The intermediate space 28, which remains between the first rotor blade 12a and the last rotor blade 12b, in the circumferential groove 10, which is otherwise completely filled with blades 12 of a blade ring, possibly with intermediate elements arranged between them, must be closed by means of a special apparatus, which is referred to as a closing assembly 33, blade lock or else rotor lock.

The closing assembly 33 comprises two parts as the front part 30 and rear part 32, with respect to the rotation axis 34 of a rotor of the turbomachinery, closing the intermediate space 28. FIG. 2 shows the closing assembly 33 with two parts 30, 32 which can move with respect to one another, during installation in the free intermediate space 28 in the circumferential groove 10. The closing assembly 33 comprises the two parts 30, 32 and a securing element 36 which is designed like a key and is arranged between the two parts 30, 32 such that it can rotate about its longitudinal axis 38. The securing element 36 is in the form of a key 37 and has, successively, a key head 40, a key shaft 42 and a key bit 44. The key bit 44 is in the form of a plate, with the opposite narrow surfaces 45 of the key bit 44 running conically towards one another, seen looking outwards, so that the key bit 44, which comprises two bit halves as a double bit, has a trapezoidal contour, overall.

Each of the two parts 30, 32 is, as is shown in FIG. 2, designed to have an essentially C-shaped cross section and in each case has an outer arm 50, an inner arm 52 and a web 54 which connects the arms 50, 52. In the illustrated embodiment, the inner arms 52 are shorter, seen in the axial direction, than the outer arms 50. Each part 30, 32 has a side surface 56 which is arranged on the web 54 and in each case faces the adjacent part 32, 30. The key bit 44 of the key 37 is arranged between the two side surfaces 56.

During installation of the closing assembly 33, the key bit 44 extends in the circumferential direction of the circumferential groove 10, so that the narrow surfaces 45 of the key bit 44 are exposed. A key area 57 which is enclosed between the two side surfaces 56 can therefore—seen in the axial direction—be particularly narrow, because of the parts 30, 32 which move with respect to one another on the groove side, that is to say in the area of the inner arms 52 (FIG. 2). The axial distance between a front projection 60a, which is arranged on the inner arm 52, and a rear projection 60b, which is arranged on the inner arm 52, is in consequence less than the axial distance A between the two projections 20, 22 on the circumferential groove 10, so that that area of the closing assembly 33 which faces the circumferential groove 10 fits between the two projections 20, 22 on the circumferential groove 10. The closing assembly 33 can be inserted into the circumferential groove 10.

In consequence, for installation of the closing assembly 33, the two parts 30, 32 are pivoted towards one another on the groove side, thus allowing the closing assembly 33 to be inserted into the circumferential groove 10 without any problems.

During the insertion movement of the closing assembly 33, the outer arms 50 come to rest on the outer surfaces 62 of the projections 20 and 22, so that continuation of the insertion movement results in the two parts 30, 32 being rotated forwards and backwards on the groove base side, that is to say being pivoted, as a result of which the projections 60, which are arranged on the inner arms 52, engage behind the projections 20 and 22 which are arranged on the side walls 16 and 18 of the circumferential groove 10. This position of the closing assembly 33, which is reached in an intermediate fitting step, is illustrated in FIG. 3 and characterizes the installed position of the parts 30, 32. The key area 57, which is bounded by the side surfaces 56, is now comparatively wide. After reaching the installed position, the securing element 36 of the closing assembly 33 is rotated, for example, through an angle of 90°, so that the narrow surfaces 45 of the key bit 44 rest on the side surfaces 56 of the parts 30, 32. This is shown in FIG. 4. The left-hand bit half rests on the side surface 56 of the front part 30, and the right-hand bit half rests on the side wall 56 of the rear part 32. This results in the axial key area 57 being filled without any gaps along the dashed line 70, so that the parts 30, 32 can no longer move with respect to one another. The closing assembly 33 is secured in a corresponding manner against falling out of the circumferential groove 10. The flat contact of the key bit 44, in which each narrow surface 57 rests on one of the side surfaces 56, ensures secure contact of the key 37, even in the event of alternating loads.

Furthermore, FIG. 4 shows that each part 30, 32 rests flat on one side wall 58 of the projection 20, 22. If, in an improbable situation, play would occur in the circumferential direction between the closing assembly 33 and one of the adjacent rotor blades 12a, 12b, or both of them, then the closing assembly 33 is secured as an entity against twisting in the circumferential groove 10, since both parts 30, 32 rest firmly on the side walls 58 without any play that will be sufficient for this to occur.

The securing element 36 has a receptacle, which is arranged at the end adjacent to the key head 40, for a rotating tool, for example a four-sided key, in order to allow it to be rotated between the illustrated positions.

FIG. 5 shows a variant of the closing assembly 33 according to the invention, in the installed position, in the form of a cross section along the section line V in FIG. 6. Slots 72 are provided on the side surfaces 56 of the parts 30, 32, and are illustrated, with the securing element masked out, in the form of the section VI in FIG. 6. The elements which are already known from FIG. 2 to FIG. 4 are annotated with identical reference symbols in FIG. 5 and FIG. 6. They each have the identical function, so that the elements and effects which are already known will not be described here.

In addition to the receptacle for the rotating tool, the securing element 36 as shown in FIG. 5 has, on its key head 40, an external thread for a threaded nut 74, possibly also a self-locking threaded nut 74, to be screwed on, by means of which the key bit 44 of the securing element 36 can be partially recessed or inserted into the two slots 72, after appropriate rotation of the threaded nut 74. In the process, the threaded nut 74 is supported on the outside of the two parts 30, 32, and is aerodynamically recessed in an external recess 76. In order to ensure that the securing element 36 is also secured against inadvertent rotation, it can also be slightly swaged with one of the two parts 30, 32.

There is no need for complex swaging of two lip-like webs, as is known from the prior art.

A combination of the closing assembly known from FIG. 4 and FIG. 5 is, of course, also feasible, in which the parts 30, 32, as shown in FIG. 4, can be braced to the two parts with a key and a threaded nut screwed on the key head side.

Overall, the closing assembly according to the invention provides an apparatus for closing the remaining intermediate space between the first and the last blades, which have been inserted in a circumferential groove in turbomachinery, of a blade ring, comprising only two parts which cover the intermediate space. In order to allow the parts to be inserted into the circumferential groove, the inner arms of the two parts can be pivoted with respect to one another, so that they can be inserted between the projections on the circumferential groove. In order to ensure that the two parts are secured in their final position against tilting and against falling out of the circumferential groove, a securing element is provided between them, which is arranged such that it can rotate about its longitudinal axis and has a key head and a key bit, and in which the key bit can be placed on at least one side wall of one part.

The invention claimed is:

1. A closing assembly for closing a remaining intermediate space between a first blade and a last blade that are inserted in a circumferential groove of turbomachine blade ring, comprising:
    a first part having a projection;
    a second part having a projection opposite the first part projection wherein the first and second parts are constructed and arranged to each be hooked by the opposite projections that form an undercut on the circumferential groove; and
    a rotatably mounted key shaped securing element arranged between the first and second parts, the securing element having a key head and a plate like key bit, wherein
        the securing element secures the first and second parts against falling out of the circumferential groove and the securing element is rotates about a longitudinal axis of the securing element,
        the securing element is positionable between a first position and a second position by rotation only of the securing element, such that
            in the first position, for fitting the assembly on the blade ring, the first and second parts are inserted at the same time into the circumferential groove by pivoting with respect to one another between the opposite projections on the circumferential groove and are then be spread apart from one another, and
            in the second position, for securing the first and second parts, against pivoting with respect to one another in their installed position, where the key bit is placed on at least one side surface of one of the spread parts.

2. The closing assembly as claimed in claim 1, wherein the securing element is designed to be moved from the first position to the second position by rotation through 90°.

3. The closing assembly as claimed in claim 2, wherein the key bit is in the form of a double bit with two bit halves, and each bit half in each case is placed on one side surface of each part.

4. The closing assembly as claimed in claim 3, wherein the side surface of the parts has a slot in for partial engagement of the key bit.

5. The closing assembly as claimed in claim 4, wherein the key head has a receptacle for a rotating tool.

6. The closing assembly as claimed in claim 5, wherein the first and second parts are placeable on a side wall foamed by a projection that forms the undercut on the circumferential groove.

7. The closing assembly as claimed in claim 6, wherein the key head has an external thread for a threaded nut to be screwed onto, which threaded nut attaches the securing element to the first and second parts.

8. The closing assembly as claimed in claim 7, wherein the key head and/or the threaded nut is recessed in the parts.

9. The closing assembly as claimed in claim 8, wherein the securing element or the threaded nut is secured against loosening.

10. A turbomachine, comprising:
a rotabably mounted rotor arranged along a rotational axis of the turbomachine, the rotor having:
a circumferential groove having a plurality of undercuts,
a plurality of rotor blades arranged in the circumferential groove of the rotor,
a closing assembly arranged between a first rotor blade and a last rotor blade in the circumferential groove, wherein the closing assembly comprises:
a first part having a projection,
a second part having a projection opposite the first part projection wherein the first and second parts are constructed and arranged to each be hooked by the opposite projections that form an undercut on the circumferential groove, and
a rotatably mounted key shaped securing element arranged between the first and second parts, the securing element having a key head and a plate like key bit, wherein
the securing element secures the first and second parts against falling out of the circumferential groove and the securing element rotates about a longitudinal axis of the securing element,
the securing element is positionable between a first position and a second position by rotation only of the securing element, such that
in the first position, for fitting the assembly on the blade ring, the first and second parts are inserted at the same time into the circumferential groove by pivoting with respect to one another between the opposite projections on the circumferential groove and are then be spread apart from one another,
and
in the second position, for securing the first and second parts, against pivoting with respect to one another in their installed position, where the key bit is placed on at least one side surface of one of the spread parts; and
a stationary section coaxially arranged and surrounding the rotor.

11. The turbomachine as claimed in claim 10, wherein the turbomachine is a gas turbine, a compressor or a steam turbine.

12. The turbomachine as claimed in claim 10, wherein the securing element is designed to be moved from the first position to the second position by rotation through 90°.

13. The turbomachine as claimed in claim 12, wherein the key bit is in the form of a double bit with two bit halves, and each bit half in each case is placed on one side surface of each part.

14. The turbomachine as claimed in claim 13, wherein the side surface of the parts has a slot in for partial engagement of the key bit.

15. The turbomachine as claimed in claim 14, wherein the key head has a receptacle for a rotating tool.

* * * * *